United States Patent
Webster et al.

(10) Patent No.: US 6,682,084 B2
(45) Date of Patent: Jan. 27, 2004

(54) CONTAINER DOLLY WITH MULTI-PURPOSE HANDLE

(75) Inventors: D. Tom Webster, Angola, IN (US); R. Andy Link, Hamilton, IN (US)

(73) Assignee: Vestil Manufacturing Company, Angola, IN (US)

(*) Notice: Subject to any disclaimer, the term of this patent is extended or adjusted under 35 U.S.C. 154(b) by 40 days.

(21) Appl. No.: 09/917,989

(22) Filed: Jul. 30, 2001

(65) Prior Publication Data

US 2003/0020249 A1 Jan. 30, 2003

(51) Int. Cl.[7] .............................. B62B 3/08; B62B 3/02; B25B 13/04
(52) U.S. Cl. .............................. 280/79.5; 280/47.371; 81/121.1; 7/151; 16/406
(58) Field of Search ....................... 280/79.5, 79.6, 280/79.11, 43.12, 43.11, 47.34, 47.36, 47.371; 414/490; 220/284, 285, 286, 260; 81/3.4, 437, 121.1; 7/138, 151; 16/406, 410, 422, 425

(56) References Cited

U.S. PATENT DOCUMENTS

| | | | | |
|---|---|---|---|---|
| 2,370,860 A | * | 3/1945 | Hanke | 16/422 |
| 2,643,566 A | * | 6/1953 | Dos Santos et al. | 81/121.1 |
| 3,733,938 A | * | 5/1973 | Smith | 81/121.1 |
| 3,802,717 A | * | 4/1974 | Eitreim | 280/79.6 |
| 3,815,767 A | * | 6/1974 | Lund et al. | 280/47.18 |
| 4,902,187 A | * | 2/1990 | Rousseau | 414/490 |
| 4,981,412 A | * | 1/1991 | Hawkins | 414/490 |
| 5,088,751 A | * | 2/1992 | Zint | 280/47.34 |
| 5,143,389 A | * | 9/1992 | Jonkers | 280/47.26 |
| 5,425,289 A | * | 6/1995 | Iwinski | 81/121.1 |
| 5,472,220 A | * | 12/1995 | Stephan | 280/79.5 |
| 5,678,976 A | * | 10/1997 | Rodriguez | 414/490 |
| 5,752,543 A | * | 5/1998 | Groening | 280/79.5 |
| 5,806,867 A | * | 9/1998 | Hampton | 280/47.34 |
| 5,819,610 A | * | 10/1998 | Brannan | 81/437 |
| 5,860,659 A | * | 1/1999 | Hart | 280/79.5 |
| 6,027,128 A | * | 2/2000 | Stich et al. | 280/47.16 |
| 6,053,516 A | * | 4/2000 | Ottaway | 280/79.5 |
| 6,315,310 B1 | * | 11/2001 | Hurt | 280/79.5 |
| 6,419,246 B1 | * | 7/2002 | Neal | 280/79.5 |

OTHER PUBLICATIONS

"Drum Dolly & Caddies", Vestil Manufacturing Company, 2 pages.

* cited by examiner

Primary Examiner—Brian L. Johnson
Assistant Examiner—Jeffrey J Restifo
(74) Attorney, Agent, or Firm—Baker & Daniels (57) ABSTRACT

A dolly for transporting material containers including a base having a pair of wheels attached thereto. A handle is removably attached to the base and has a seal and plug removal wrench fixedly attached near one end thereof. A second plug removal wrench is fixedly attached near the opposite end of the handle. A tilting lever is fixedly secured to the handle, whereby a portion of the material container is raised with the tilting lever, and the base is positioned underneath the material container.

16 Claims, 6 Drawing Sheets

CONTAINER DOLLY WITH MULTI-PURPOSE HANDLE

BACKGROUND OF THE INVENTION

The present invention relates to a dolly for moving containers and more specifically to a multi-purpose dolly.

In general, a typical facility or warehouse may have a variety of different cylindrical containers which must be transported from one location to another. Accordingly, a variety of conventional, single size dollies must be available to accommodate movement of these various sized containers. Common cylindrical containers include 55-gallon drums, 30-gallon drums, 5-gallon buckets, and standard propane tanks of varying capacity. In order to move each of these various sized containers, it is desirable to obtain multiple drum dollies, each having a diameter corresponding to a specific container size. It may further be desirable to have multiple dollies of each size to enable movement of more than one container at a time by multiple workers.

The drum dollies used for transporting or moving cylindrical drums of material include a cylindrical outer ring and interior members which extend diametrically between the outer ring. The cylindrical ring is slightly larger than the outer diameter of the container or drum to be moved by the dolly. The interior members allow larger sized dollies to be used to transport smaller drums by preventing these drums from falling through the outer ring. These types of dollies are generally provided with wheels or casters mounted below the outer ring to allow movement thereof.

A shortcoming which exists in this market relates to the hardware necessary to work with the various drums. Drums which may be transported using these dollies may have different types and/or sizes of plugs and seals. These plugs are placed in a pour hole located in the drum with a seal located over the plug to prevent leakage of the material located therein during transport, for example. In order to remove such seals and plugs, one of several wrenches designed particularly for removing drum seals and plugs is used. These wrenches are provided with multiple sized heads so that different wrenches are not required for each type of plug or seal. A problem with this is that if the wrench is not carried by the worker, it may be difficult to open or unseal these drums.

Finally, the present dolly designs are difficult to operate given the various weights of drums being moved. Particularly with 55-gallon drums, the positioning of the dolly underneath the drum requires two persons due to the weight of the drum. This requires that more than one person be available to transport drums within a warehouse of facility which ineffectively utilizes the facilities' resources.

The objects of the invention are to alleviate the shortcomings of the prior art.

SUMMARY OF THE INVENTION

The objects of the invention have been accomplished by providing a container dolly having a removable handle attached to the base of the dolly. The handle is provided with a plug and seal wrench attached near one end thereof. A tilting lever and a plug removal wrench are attached near an opposite end of the handle. The tilting lever may be used to tilt a 55-gallon drum, for example, so that the dolly base may be slid underneath the drum, requiring only one person to move the drum. The wrenches are fixedly attached to the handle, each being of a conventional type used to remove a multitude of types of plugs and seals.

The present invention provides a dolly for transporting material containers comprising a base having a wheel attached thereto. A handle is removably attached to the base and at least one wrench is fixedly attached to the handle.

The present invention further provides a dolly for transporting material containers comprising a base having a wheel attached thereto. A handle is removably attached to the base and a tilting lever is fixedly secured to the handle, whereby a portion of the material container is raised and the base is positioned underneath the material container.

The present invention also provides a dolly for transporting material containers comprising a base having a pair of wheels attached thereto. A handle support is fixedly attached to the base and a handle is removably attached to the handle support. The handle has two ends. At least one wrench and a tilting lever are fixedly attached to the handle, whereby a portion of the material container is raised and the base is positioned underneath the material container.

The present invention also provides a method for transporting material containers comprising removing a handle of a dolly from a base of the dolly, tilting the material container with the handle, and sliding the base underneath the material container. The method further includes lowering the material container, reattaching the handle to the base, and pulling the dolly to a desired location.

An advantage of the present invention is that drums of significant weight may be moved by a single person.

A further advantage is that the plug and seal wrenches required to open drums are fixedly mounted to the handle so that they do not have to be separately carried by the worker.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

Figure 1:
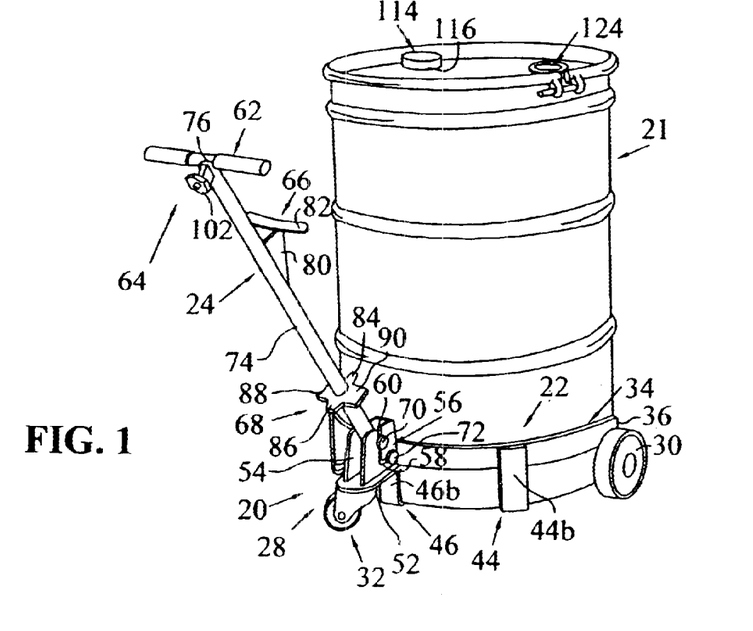
FIG. 1 is a perspective view of the dolly carrying a material container in accordance with the present invention.

Referring to FIG. 1, a dolly 20 for transporting containers 21 within a facility or a warehouse generally comprises a base 22 having handle 24 removably secured thereto. The base 22 comprises a U-shaped dolly support platform 26, a handle support 28, and rollers in the form of wheels 30 and a caster 32.

Figure 3:
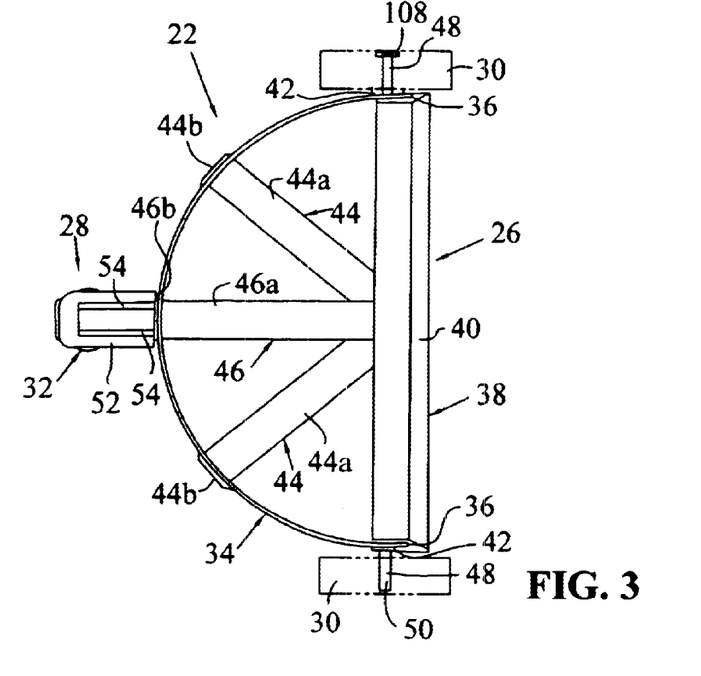
FIG. 3 is a top plan view of the dolly base.
Figure 4:
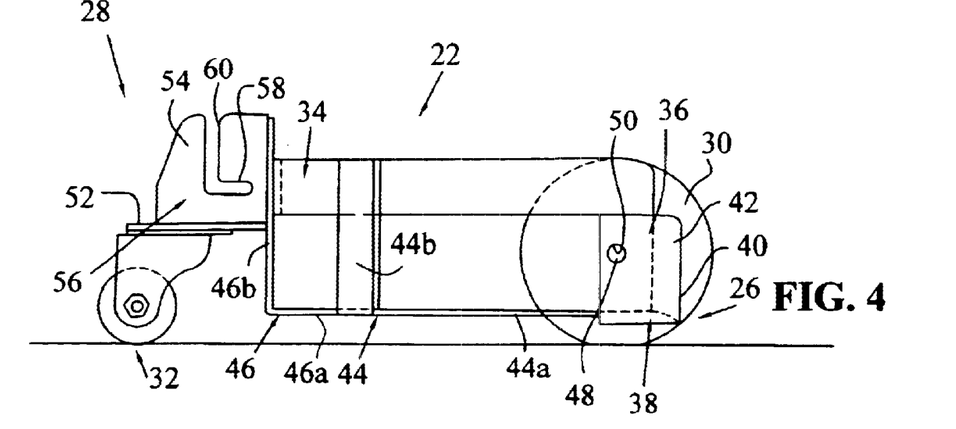
FIG. 4 is a side plan view of the dolly base of FIG. 3.

With reference now to FIGS. 3 and 4, the base 22 will be described in greater detail. As shown best in FIG. 3, the dolly platform 26 comprises a semicylindrical strap 34 having ends 36, and a front strap 38 comprising a diametrical portion 40, including a lead-in surface, and upstanding end sections 42. The dolly platform further comprises straps 44, 46 including a radial strap section 44a, 46a, together with a vertical portion 44b, 46b (FIG. 4). Axles 48 extend through apertures (not shown) in ends 36, 42, where the axles 48 include a transverse hole at 50, as described in greater detail herein.

Figure 2:
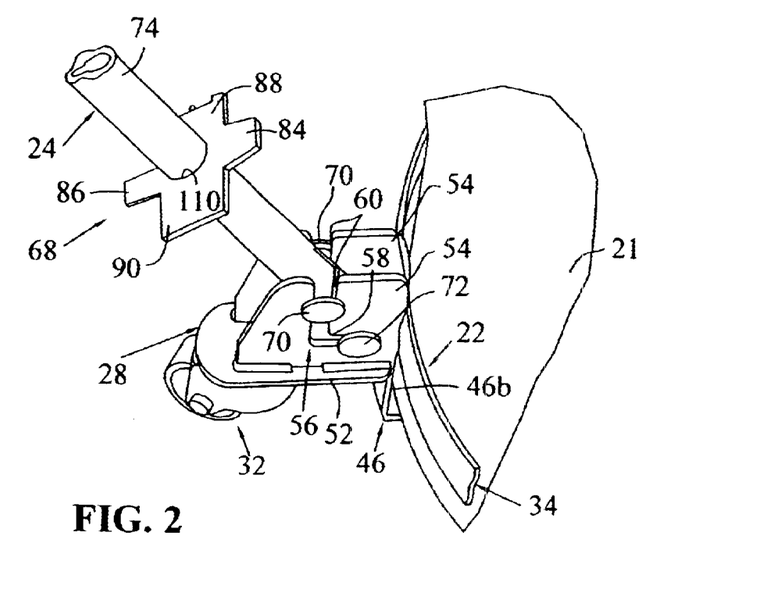
FIG. 2 is an enlarged perspective view of the dolly handle assembled to the dolly base.

As shown best in FIGS. 2 and 4, the handle support 28 is attached to the back side of vertical strap portion 46b, and includes a transverse plate 52, having upstanding plate portions 54, attached to both the rear of vertical strap portion 46b, and plate 52. It should be appreciated by those skilled in the art that the attachment of the above-mentioned plates is accomplished by welding, although alternative methods are also possible for example by bolting or the like. With reference still to FIGS. 2 and 4, the plate portions 54 include a receiving slot 56 comprising a horizontal section 58 and a vertical section 60.

Figure 5:
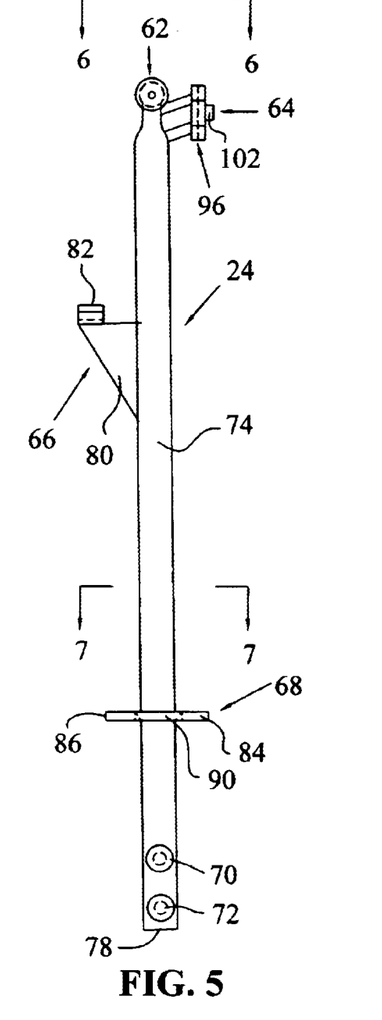
FIG. 5 is a side plan view of the dolly handle.
Figure 6:
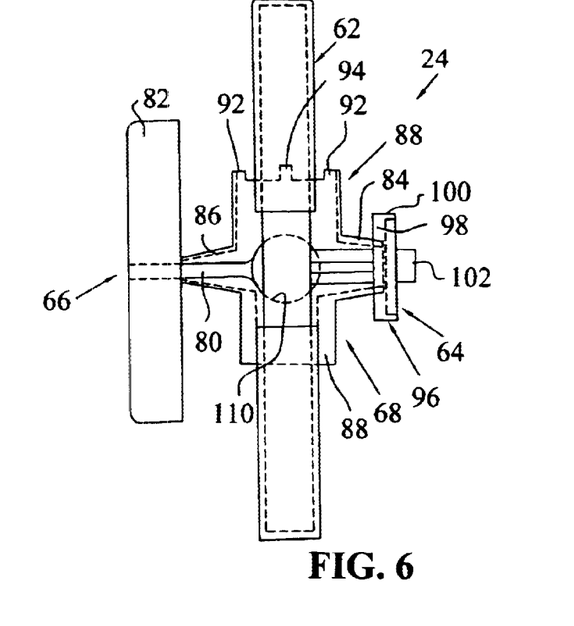
FIG. 6 is a top plan view of the dolly handle of FIG. 5.

With reference now to FIGS. 5 and 6, the handle 24 will be described in greater detail. The handle 24 generally comprises an elongated shaft having steering grip 62, plug removal wrench 64, tilting lever 66, plug and seal wrench 68, and two pairs of engagement lugs 70, 72 affixed thereto. Referring still to FIGS. 5 and 6, the handle 24 includes an elongated shaft 74 which may be any suitable shape including having a substantially rectangular or circular cross section, for example. The steering grip 62 is mounted to an end 76 of the elongated shaft 74 with the plug removal wrench 64 also located on the shaft 74, adjacent steering grip 62 (FIG. 5). The tilting lever 66 is mounted on the shaft 74 longitudinally spaced away from the plug removal wrench 64 and protruding from the shaft 74 in a direction opposite to that of the plug removal wrench 64.

Figure 7:
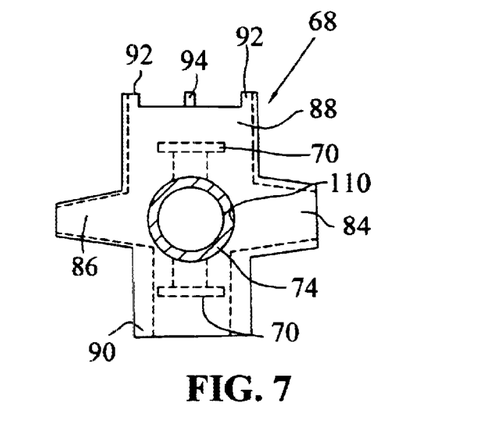
FIG. 7 is a sectional view of the dolly handle of FIG. 5 through lines 7—7.
Figure 8:
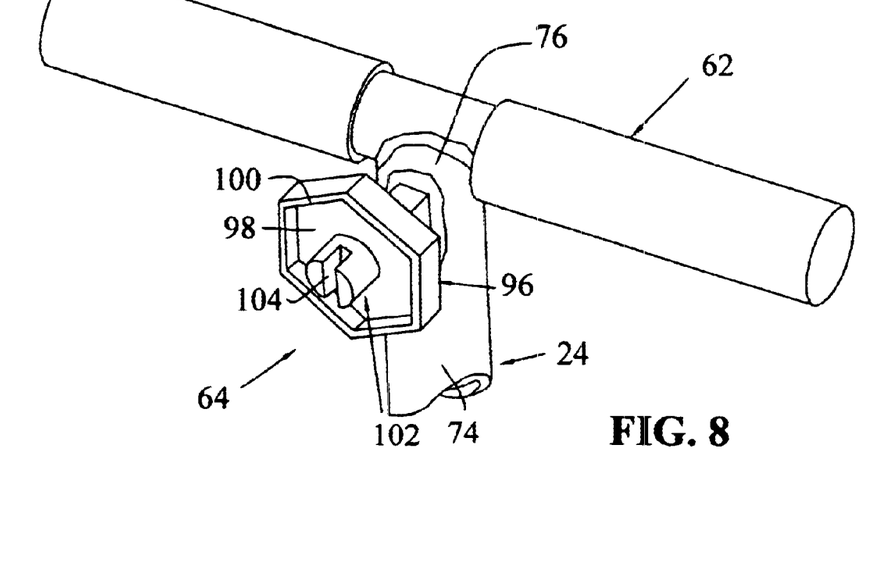
FIG. 8 is an enlarged perspective view of a plug removal wrench attached to the dolly handle of FIG. 5.

As illustrated in FIG. 5, the pairs of the engagement lugs 70, 72 are located longitudinally spaced from one another near an end 78 of the handle 24. The lugs of each pair of the engagement lugs 70, 72 are positioned across from one another, sharing a common longitudinal axis as illustrated in FIG. 7. The plug and seal wrench 68 is affixed to the shaft 74, and is spaced longitudinally from engagement lugs 70, 72, toward the end 76 from the end 78. The steering grip 62, the plug removal wrench 64, the tilting lever 66, the plug and seal wrench 68, and the engagement lugs 70, 72 may be attached to the elongated shaft 74 by any suitable attachment method including welding, brazing, or the like. It should be appreciated by those skilled in the art that the attachment of the above-mentioned elements may also be accomplished by an alternative method including bolting, for example.

Referring again to FIGS. 5 and 6, the tilting lever 66 will be discussed in more detail. The tilting lever 66 includes a connecting member 80 having a contact bar 82 attached thereto by any suitable method. The contact bar 82 is positioned substantially perpendicular to connecting member 80.

Referring now to FIG. 7, the plug and seal wrench 68 will be described in more detail. The plug and seal wrench 68 is provided with four wrench heads 84, 86, 88, and 90 of varying size and shape, each extending approximately perpendicularly from the longitudinal axis of the shaft 74. The wrench heads 84 and 86 located opposite one another have trapezoidal shapes and are of different sizes. The wrench heads 88 and 90 are also located opposite one another and are rectangular in shape. Wrench head 88 includes protrusions 92 located at each edge of the wrench head 88 with a peg 94 located at the midpoint between protrusions 92.

Referring to FIGS. 1, 5, 6, and 8, the plug removal wrench 64 includes a socket portion 96 having a base portion 98 and an outer rim 100. The outer rim 100 is located about the periphery of the socket portion 96, extending approximately perpendicularly from base portion 98. The plug removal wrench 64 has protrusion 102 centrally located in base portion 98, protruding approximately perpendicularly therefrom and having groove 104 formed therein.

Referring again to FIGS. 3 and 4, the assembly of the base 22 will now be discussed. The vertical portions 44b, 46b of straps 44, 46 are affixed to the back side of the semicylindrical strap 34 by welding, radially spaced from one another. The front strap 38 is positioned such that apertures (not shown) in the end sections 42 thereof align with apertures (not shown) in the ends 36 of the semicylindrical strap 34. The free end of the straps 44, 46 are affixed to the underside of the front strap 38, at the midpoint thereof, by welding. The handle support 28 is attached to the back side of the vertical portion 46b and the caster 32 is fixedly secured to the underside of the transverse plate 52, both by welding. The axles 48 are placed through the aligning apertures in the ends 36 and 42. The wheels 30 have apertures 106 therethrough in which the axles 48 are rotatively received. Located in the free end 50 of the axles 48 is the transverse hole which is engaged by a cotter pin 108 to removably attach the wheels 30 on the axles 48.

Referring again to FIGS. 5, 6, and 7, the assembly of handle 24 will now be described. By welding, the steering grip 62 is secured to the end 76 of the elongated shaft 74, approximately perpendicularly to the longitudinal axis of the shaft 74. The plug removal wrench 64 is affixed to the elongated shaft 74, adjacent the steering grip 62, protruding from the shaft 74 in a direction substantially perpendicularly to the steering grip 62. Longitudinally spaced from the plug removal wrench 64 is the tilting lever 66 which is fixedly attached to the shaft 74 by welding, protruding from the shaft 74 in a direction opposite to that of the wrench 64. The plug and seal wrench 68 is mounted on the elongated shaft 74, near the end 78 thereof and spaced longitudinally from the engagement lugs 70, 72. The plug and seal wrench 68 has an aperture 110 located centrally therein, sized to have a diameter approximately equal to the outer diameter of the shaft 74. The end 78 of the elongated shaft 74 is received in the aperture 110 and the plug and seal wrench 68 is moved along the shaft 74 until it is located in the desired position, where it is welded to the shaft 74. The engagement lugs 70, 72 are fixedly attached near the end 78 of the elongated shaft 74 by welding or bolting, for example. Each pair of the engagement lugs 70, 72 have a common axis and extend perpendicularly from the shaft 74 in the same direction as the steering grip 62.

Figure 9:
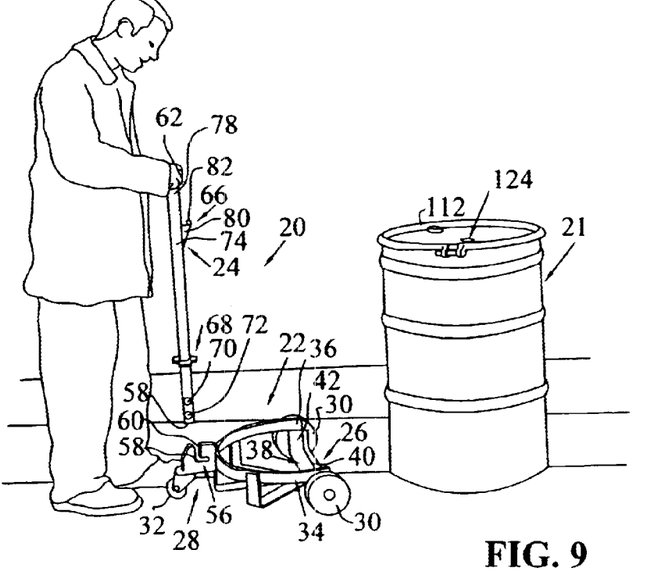
FIG. 9 is a side plan view of the dolly handle removed from the dolly base.

With reference to FIGS. 1, 2, and 9, the assembly of the dolly 20 will now be described. The handle 24 is aligned with the handle support 28 such that the engagement lugs 70, 72 are in line with the vertical section 60 of the receiving slot 56. The handle 24 is lowered into the vertical section 60 until the engagement lugs 72 nearest the end 78 are aligned with the horizontal section 58 of the receiving slot 56. The handle 24 is then pivoted rearwardly, away from the dolly base 22 so that the engagement lugs 72 engage the horizontal section 58, thereby locking the handle 24 into the handle support 28.

Figure 10:
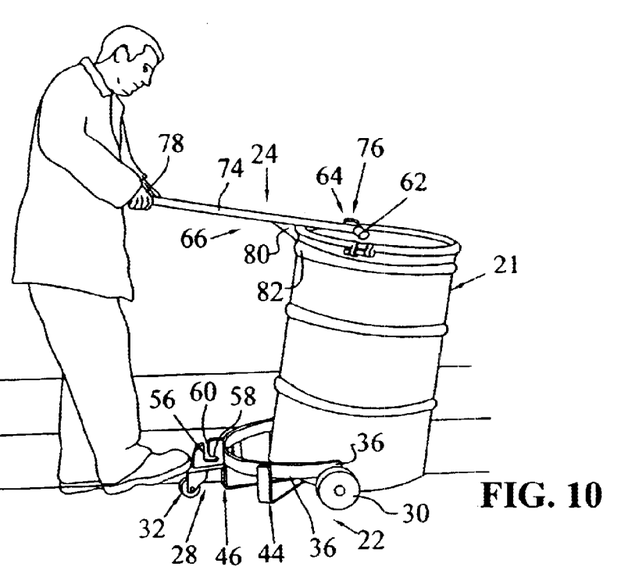
FIG. 10 is a perspective view of the dolly handle being used to tilt a material container.

With the dolly 20 assembled as described, the use of the dolly will be further described. Referring to FIGS. 9 and 10, when loading the dolly 20 with the drum 21, the handle 24 is first removed from its locked position in the handle support 28. The handle 24 is brought to a vertical position so that the engagement lugs 72 in the horizontal section 58 align with the vertical section 60. The handle 24 is lifted upwardly out of the handle support 28. The tilting lever 66 is then positioned such that the contact bar 82 is placed near the upper edge of the drum 21 (FIG. 10). The user then applies force to the end 78 of the elongated shaft 74 of the handle 24, raising a portion of the drum 21. The contact bar 82 is shaped to approximately fit the contour of the drum 21, however, the contact bar 82 may be of any shape which enables tilting of the drum 21. While tilting the drum 21, the user slides the base 22 into position underneath the drum 21 using his/her foot (FIG. 10). The drum 21 is then lowered and the handle 24 is replaced into the handle support 28 in the same manner as described above.

With the handle 24 returned to its assembled position with the base 22, the user grasps the steering grip 62, pulling the dolly 20 and thus the drum 21 from one position within the facility or warehouse to another. The wheels 30 are rotatably secured to the base 22 to allow for movement of the dolly 20. The caster 32 rotates about its axis, allowing the dolly 20 to turn as the user guides the dolly to a desired location.

Figure 12:
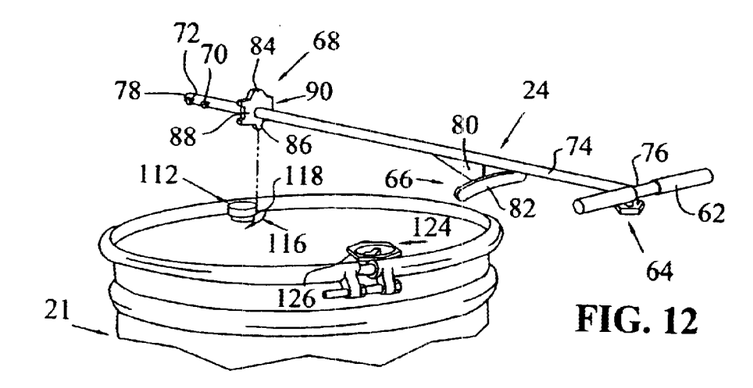
FIG. 12 is a perspective view of the material container with the plug and seal wrench on the dolly handle in position over a seal.
Figure 13:
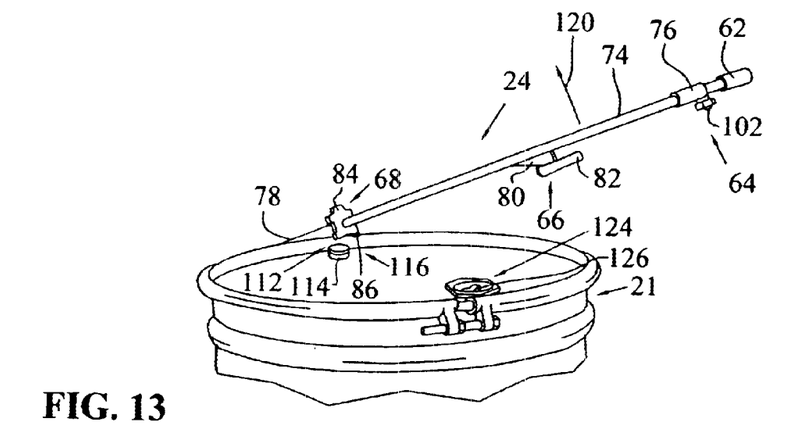
FIG. 13 is a perspective view of the material container of FIG. 12 showing the plug and seal wrench engaging the seal.

The plug removal wrench 64 and the plug and seal wrench 68 are wrenches conventionally used to remove different types and sized seals and plugs from material containers or drums. An example of one type of seal is shown in FIGS. 12 and 13. A seal 112 is secured over a plug 114 located in a pour hole in the drum 21. Referring to FIG. 13, the seal 112 is provided with a tab 116 having a hole 118 therethrough into which the wrench head 86 is received. The handle 24 is then pivoted in the direction of arrow 120 and the plug and seal wrench 68 peels the seal 112 from the plug 114.

Figure 14:
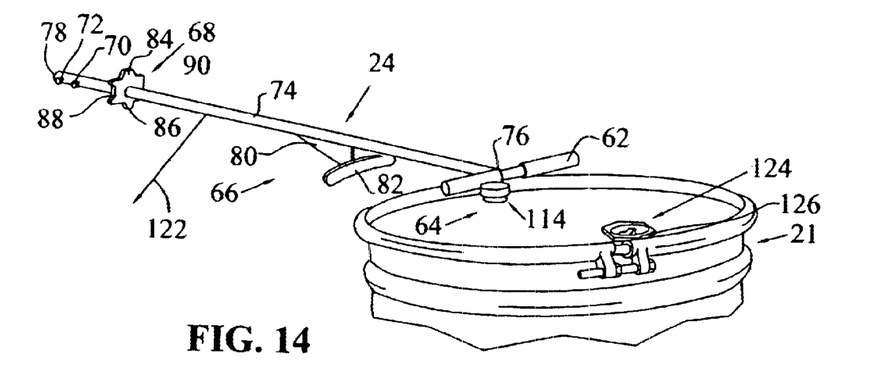
FIG. 14 is a perspective view of the material container of showing the plug removal wrench engaging the plug after the seal has been removed.

With reference now to FIG. 14, once the seal 112 is removed from the plug 114, the plug removal wrench 64 is used to unthread the plug from the pour hole in the drum 21. The plug removal wrench 64 is positioned over the plug 114 such that the outer rim 100 of the socket portion 96 and the groove 104 in the protrusion 102 engage complementary portions (not shown) of the plug 114. By grasping the end 78 of the elongated shaft 74, and rotating the handle 24 radially in the direction of arrow 122, the plug 114 is unthreaded from the drum 21.

Figure 11:
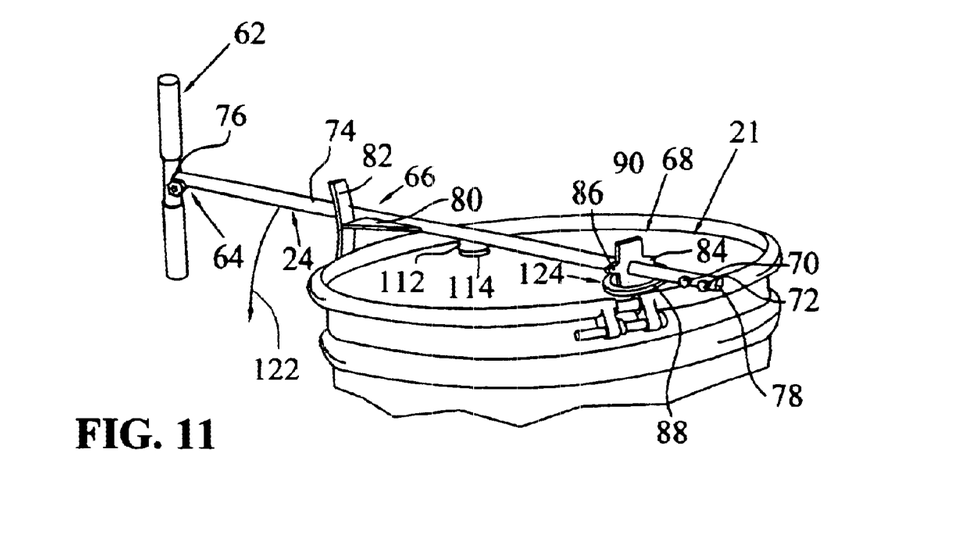
FIG. 11 is a perspective view showing a plug and seal wrench engaging a plug in a material container.

Referring now to FIG. 11, the plug and seal wrench 68 may be used to remove other types of pour hole plugs including a plug 124. The wrench head 88 of the plug and seal wrench 68 is used to remove this type of plug. As discussed above, the wrench head 88 as illustrated in FIG. 7 is provided with the protrusions 92 and the peg 94. As illustrated in FIGS. 12, 13, and 14, the protrusions 92 engage opposite sides of a central bar 126 in the plug 124 while the peg 94 engages an aperture (not shown) in the bar 126. The handle 24 is then rotated radially in the direction of arrow 122 such that the protrusions 92 contact the bar 126, applying a force to the contact bar 126, and thus unthreading the plug 124.

Advantageously, the dolly 20 alleviates the shortcomings of the prior art. The positioning of the dolly underneath the drum no longer requires two persons, one person to lift the drum 21 and one person to slide the dolly 20 into position underneath the drum 21. With the handle 24 being removable and having the tilting lever 66 mounted thereon, the user can both tilt the drum 21 and slide the base 22 underneath the drum 21 using his foot (FIG. 10). The drum 21 is then lowered and the handle 24 is replaced into the handle support 28 so that the user may transport the material container. Further, by fixedly mounting the plug and seal wrench 68 and the plug removal wrench 64 to the elongated shaft 74 of the handle 24, the need to carry these tools separately is eliminated.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A dolly for transporting material containers, comprising:

a base having a roller mechanism attached thereto;

a handle removably attached to said base; and at least one plug wrench fixedly attached to said handle a handle support fixedly secured to said base, said handle removably attached to said handle support said handle further comprises two pairs of engagement tugs located on said handle; and said handle support further comprises a transverse plate and a plate portion, said plate portion having a slot formed therein in which said engagement lugs are received.

2. The dolly of claim 1, wherein one of said plug wrenches is a plug removal wrench.

3. The dolly of claim 2, wherein one of said plug wrenches is a plug and seal removal wrench, said plug wrench having a plurality of wrench heads, said wrench heads having different sizes and shapes.

4. The dolly of claim 1, wherein a pair of said plug wrenches are fixedly secured to said handle.

5. The dolly of claim 1, wherein one of said plug wrenches is positioned near said first end of said handle.

6. A dolly for transporting material containers, comprising:

a base having a roller mechanism attached thereto;

a handle removably attached to said base; and a tilting lever secured to said handle, said tilting lever including a contact bar, said contact bar configured to engage an edge of the material container to raise a portion of the material container and thereby permitting said base to be positioned underneath the material container.

7. The dolly of claim 6, wherein said contact bar has a shape complementary to a contour of the material container.

8. The doily of claim 6, wherein said handle further comprises two ends, one of said ends attaching to said base, and of said ends including a steering grip, said tilting lever mounted to said handle near said steering grip.

9. The dolly of claim 6, further comprising a handle support fixedly secured to said base, said handle removably attached to said handle support.

10. The dolly of claim 9, said handle further comprises two pairs of engagement lugs located on said handle.

11. The dolly of claim 10, wherein said handle support further comprises a transverse plate and a plate potion, said plate portion having a slot formed therein in which said engagement jugs are received.

12. A dolly for transporting material containers, comprising:
   a base having a roller mechanism attached thereto;
   a handle support fixedly attached to said base;
   a handle having a first end removably attached to said handle support, and a second end;
   at least one wrench fixedly attached to said handle; and
   a tilting lever fixedly secured to said handle said tilting lever including a contact bar, said contact bar configured to engage an edge of the material container to raise a portion of the material container and thereby permitting said base to be positioned underneath the material container.

13. The dolly of claim 12, wherein a pair of said wrenches are fixedly secured to said handle, a first of said wrenches located near said first end of said handle, and a second of said wrenches located near said second end of said handle.

14. The dolly of claim 13, wherein one of said wrenches is a plug removal wrench.

15. The dolly of claim 13, wherein one of said wrenches is a plug and seal removal wrench, said wrench having a plurality of wrench heads, said wrench heads having different sizes and shapes.

16. The dolly of claim 12, wherein said contact bar has a shape complementary to a contour of the material container, said tilting lever mounted to said handle near said one of said ends of said handle.

* * * * *

UNITED STATES PATENT AND TRADEMARK OFFICE
CERTIFICATE OF CORRECTION

PATENT NO.      : 6,682,084 B2
DATED           : January 27, 2004
INVENTOR(S)     : D. Tom Webster et al.

It is certified that error appears in the above-identified patent and that said Letters Patent is hereby corrected as shown below:

Column 6,
Line 60, insert -- when said handle is removed -- between the words "container" and "to"

Signed and Sealed this

First Day of June, 2004

JON W. DUDAS
*Acting Director of the United States Patent and Trademark Office*